Oct. 25, 1960  B. J. HULLEY  2,957,622
FLUID-OPERATED COMPUTING APPARATUS
Filed Oct. 21, 1957
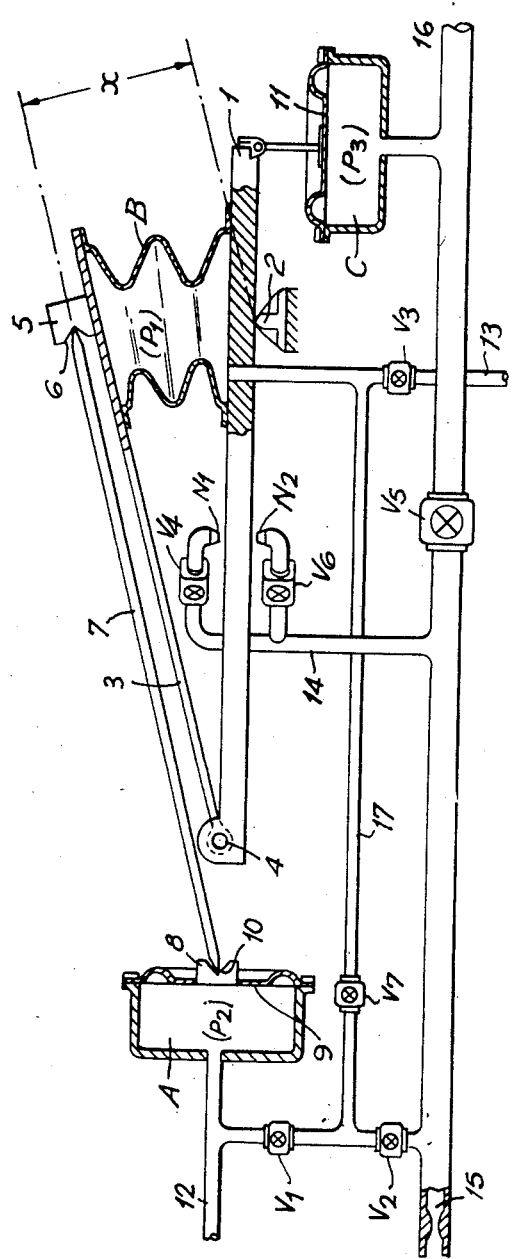
INVENTOR
BERNARD JAMES HULLEY
ATTORNEY

United States Patent Office 2,957,622
Patented Oct. 25, 1960

2,957,622
FLUID-OPERATED COMPUTING APPARATUS

Bernard James Hulley, Harlow, England, assignor to Sunvic Controls Limited, London, England, a British company Filed Oct. 21, 1957, Ser. No. 691,477

Claims priority, application Great Britain Oct. 29, 1956

3 Claims. (Cl. 235—61)

This invention relates to fluid-operated computing apparatus, that is, pneumatic or hydraulic apparatus capable of providing an output pressure signal that is a given function of one or more input pressures.

In process control systems where the controlled variables are converted to pneumatic pressure signals for transmission to the control or indicating station, it is sometimes necessary to perform arithmetic operations on these signals. Instruments exist which produce a signal which is the sum of two input signals and is used for example to add signals representing the levels of two tanks, giving an output representing the total head available.

It is an object of the invention to provide a computing apparatus which can be adapted to produce an output signal which is either the product or quotient of two pressures or the square, square root or reciprocal of a single pressure. Applications of such apparatus could include for instance the multiplication of pressures proportional to the temperature and flow of a fluid through a pipe, giving an output representing the heat flow through the pipe; or the apparatus might be used to extract the square root of a signal from an orifice type flow meter, giving a signal linear with flow.

According to the invention there is provided a fluid-operated computing apparatus comprising a pivoted member, a part carried by said member for movement towards and away therefrom transversely of its pivot axis, a first pressure fluid device disposed between said part and said member such that the distance therebetween bears a substantially proportional relationship to fluid pressure in the device, a second pressure fluid device coupled to said part to apply thereto in a direction transverse to its line of movement a force substantially proportional to fluid pressure in this second device, said part being constrained against movement in the direction of this force whereby the latter will produce a turning moment on said member about its fulcrum, and a third pressure fluid device coupled to said member at a position removed from its pivot to apply thereto a force substantially proportional to fluid pressure in the third device and producing an opposing moment, one of said two force applying pressure fluid devices constituting part of a servo system tending to maintain the angular position of said member about its pivot constant.

The apparatus of the invention may be used to obtain an output pressure signal that is proportional to the product or quotient of two input pressures—which may in turn be respectively proportional to other magnitudes—or is proportional to the square or square root of a single input pressure. Thus two pressures to be multiplied together would be applied respectively to the first and second of the pressure fluid devices mentioned, when the pressure in the third device, which in this case would constitute the feedback element for the servo system, would represent the product. Likewise a single pressure of which the square is wanted would be applied in common to the first and the second pressure fluid devices and the pressure in the third would then represent the square. For dividing one pressure by another, the first device would be arranged to constitute the feedback element and the numerator and denominator pressures would be applied to the third and second pressure fluid devices respectively, the resulting pressure in the first device then representing the required quotient. A square root signal may be obtained by applying the input pressure to the third pressure fluid device and applying the feedback pressure in common to the first and second devices, this latter pressure representing in the steady state the desired square root.

It is also possible to obtain reciprocals as will be described hereinafter.

In order to give a fuller understanding of the invention and the manner in which apparatus conforming thereto performs its computing function, a particular embodiment of the invention will now be described, by way of example, with reference to the accompanying drawing the single figure of which illustrates the embodiment in a somewhat schematic manner.

Referring to the drawing, a table 1 is freely pivoted about a fixed pivot or fulcrum 2 beneath it and carries parallel arms 3 (only one seen) hinged to the top of the table 1 at a position 4 removed from the fulcrum 2. A block 5 carried by the arms 3 adjacent the far end thereof from the hinge end 4, is formed with a V-notch 6 facing along the arms towards the hinge end. A push rod 7, pointed at each end to permit free pivoting action at its ends, pivotally engages at one end in the notch 6 of the block 5 and at the other end likewise engages in a similarly notched block 8 carried by a flexible pressure-responsive diaphragm 9 forming one wall of a pressure chamber A. The position, 10, at which the push rod 7 engages in the block 8 is preferably coincident with the hinge axis 4 of the arms 3, the rod 7 being disposed intermediately of the arms 3 to permit this. For clarity, however, the position 10 has been shown displaced from the hinge axis 4. A bellows device B is arranged between the table top and the hinged arms 3 so that the distance of the block 5 from the table 1 is proportionally related to the pressure P1 in the bellows B, it being appreciated, therefore, that the table 1 and the arms 3 with the block 5 constitute respectively the pivoted member and the part carried thereby as referred to hereinbefore and in the claims. Pressure P2 in the chamber A acts on the diaphragm 9 and produces in the push rod 7 a compressive force which in turn produces a moment on the table system 1 about the fulcrum 2; the hinged arms 3 react the thrust of the push rod 7 on to the table and thereby prevent shear on the bellows B. The length $x$ of the moment arm of the force thus applied is determined by the extension of the bellows B and thus by the bellows pressure P1, so that the moment is proportional to the product of the pressure P2 in chamber A and the bellows pressure P1. A second pressure-responsive diaphragm 11 forming one wall of a pressure chamber C is coupled to the table 1 at a fixed distance from the fulcrum 2 to apply according to the pressure P3 within the chamber C a force producing an opposing moment.

For obtaining a pressure signal proportional to the product of two input pressure signals, the input pressures are respectively applied to the chamber A by the pipe 12 and to the bellows B by the pipe 13, valves V1 and V2 being closed and V3 open at this time. The pressure in chamber C acting on diaphragm 11 is controlled in accordance with deviation of the table 1 from a given angular position so as to tend to maintain the angular position constant; that is, the diaphragm 11 and chamber C constitute the feedback element of a servo system. Deviation of the table position may be detected, and may control the pressure applied to the chamber C, in any convenient manner, but where, as is contemplated, the pressure system is a pneumatic one, the arrangement illustrated employing a nozzle N1 sensitive to the table position may conveniently be employed. This nozzle N1 is positioned close to and directed on to the top of the table 1 and is fed with air tapped off through pipe 14 from a pressure supply line 15 to the chamber C, valves V4 and V5 being open and V6 closed. If the table tilts so that its top approaches nearer the nozzle, so tending to obstruct its mouth to a greater extent, the amount of air passing through pipe 13 is reduced and the pressure in chamber C therefore increases. This has the result of tilting the table in the opposite direction until a state of equilibrium is reached. The converse action takes place if the table initially recedes from the nozzle.

With input pressures P2 and P1 thus applied to the chamber A and the bellows B, and with the table equilibrium maintained by the servo system as just indicated, the pressure P3 in chamber C behind the diaphragm 11 will be substantially proportional to the moment produced by the force applied to the rod 7 by the diaphragm 9. The pressure P3 is therefore substantially proportional to the product of the two input pressures and is transmitted as such over pipe 16 to a utilisation device (not shown) responsive to the pressure.

For obtaining a pressure signal proportional to the square of an input pressure, the latter is applied in common from the pipe 12 to the chamber A and to the bellows B over pipe 17, valves V1 and V7 being opened and V2 and V3 closed. With the table maintained in equilibrium as before, namely by the feedback action of the diaphragm 11 and chamber C, the pressure in chamber C will be substantially proportional to the desired square.

When it is desired to use the apparatus to give a pressure signal substantially proportional to the quotient of two input pressures, the numerator and denominator input pressures are applied respectively to the chamber C over pipe 16 and to the bellows B over pipe 13, valve V3 being open. The nozzle action is reversed and arranged to maintain equilibrium by controlling the pressure in chamber A behind the diaphragm 9, to which end a nozzle N2 acting on the underside of the table is brought into action by closing valve V4 and opening valve V6, while the supply line 15 is isolated from chamber C by closing valve V5 and connected instead to chamber A by opening valves V1 and V2 and closing valve V7. The pressure in chamber A will then be proportional to the desired quotient and is transmitted over pipe 12. Likewise square roots may be obtained by applying input pressure to the chamber C over pipe 16 and maintaining table equilibrium by controlling a common pressure in the bellows B and chamber A, this common pressure appearing in pipe 12 and giving the square root signal. For this latter purpose, valves V1, V2, V6 and V7 are opened and valves V3, V4 and V5 closed.

Finally, reciprocals may be obtained with the same valve settings as used for obtaining quotients, by maintaining a fixed pressure in the chamber C (or by replacing this diaphragm by a spring applying fixed pressure), applying to the bellows B the input pressure of which a signal proportional to the reciprocal is required, and maintaining table equilibrium by controlling the pressure in chamber A behind the diaphragm 9, which latter pressure will then be proportional to the reciprocal of the pressure applied to the bellows.

It will be appreciated that the pipe 18 actually leading into the bellows B will have to be flexible or otherwise arranged to permit unimpeded pivotal movement of the table 1 about its fulcrum 2. It will also be appreciated that where the apparatus is required to perform one mathematical function only and facilities for performing others are therefore not needed, those parts shown in the drawings which are then irrelevant, namely one of the nozzles, the valves, and those pipes which are not then used, can be omitted. If some but not all of the functions are to be catered for, any parts which are then unnecessary can likewise be omitted.

What I claim is:

1. A fluid-operated computing apparatus comprising a pivoted member, a part carried by said member for movement towards and away therefrom transversely of its pivot axis, a first pressure fluid device disposed between said part and said member such that the distance therebetween bears a substantially proportional relationship to fluid pressure in the device, a second pressure fluid device coupled to said part to apply thereto in a direction transverse to its line of movement a force substantially proportional to fluid pressure in this second device, said part being constrained against movement in the direction of this force whereby the latter will produce a turning moment on said member about its pivot, a third pressure fluid device coupled to said member at a position removed from its pivot to apply thereto a force substantially proportional to fluid pressure in the third device and producing an opposing moment, and a servo system responsive to angular displacement of said member about its pivot and acting on one of said force-applying pressure fluid devices to tend to maintain the angular position of said member about its pivot constant.

2. Apparatus as claimed in claim 1 wherein the first pressure fluid device is constituted by bellows and the second and third pressure fluid devices are constituted by respective pressure-responsive diaphragms.

3. A fluid-operated computing apparatus comprising a pivoted member, at least one arm hinged on said member for angular movement towards and away from a surface therof about an axis substantially parallel to and spaced in one direction from the pivot axis of said member, bellows disposed and acting between said surface of the member and a position on such arm removed from the hinge axis thereof, a push rod having one end pivotally engaged with respect to said arm at a position removed from said hinge axis, a first pressure-responsive diaphragm disposed adjacent the hinge axis of the arm and acting along the push rod at its other end, the push rod having this other end pivotally engaged with respect to the diaphragm, a second pressure-responsive diaphragm acting on said member at a position spaced from its pivot axis in a direction opposite to that in which the hinge axis of the arm is spaced from said pivot axis, a nozzle disposed close to and directed towards the pivoted member and a servo system including said nozzle and one of said diaphragms acting in conjunction with each other, said servo system tending to maintain a constant angular position of the said member.

References Cited in the file of this patent

UNITED STATES PATENTS 2,736,199    Ibbott _____ Feb. 28, 1956